United States Patent
Edelhaeuser et al.

(10) Patent No.: US 12,064,813 B2
(45) Date of Patent: Aug. 20, 2024

(54) ADDITIVE MANUFACTURING METHOD WITH CONTROLLED SOLIDIFICATION AND CORRESPONDING DEVICE

(71) Applicant: EOS GmbH Electro Optical Systems, Krailling (DE)

(72) Inventors: Sebastian Edelhaeuser, Zorneding (DE); Michael Goeth, Munich (DE); Ludger Huemmeler, Gauting (DE)

(73) Assignee: EOS GmbH Electro Optical Systems, Krailling (DE)

( * ) Notice: Subject to any disclaimer, the term of this patent is extended or adjusted under 35 U.S.C. 154(b) by 1003 days.

(21) Appl. No.: 16/970,582

(22) PCT Filed: Jan. 18, 2019

(86) PCT No.: PCT/EP2019/051224
§ 371 (c)(1),
(2) Date: Aug. 17, 2020

(87) PCT Pub. No.: WO2019/158303
PCT Pub. Date: Aug. 22, 2019

(65) Prior Publication Data
US 2020/0376556 A1  Dec. 3, 2020

(30) Foreign Application Priority Data
Feb. 19, 2018  (DE) .......................... 102018202506.1

(51) Int. Cl.
*B22F 10/80*  (2021.01)
*B22F 10/28*  (2021.01)
(Continued)

(52) U.S. Cl.
CPC .............. *B22F 10/80* (2021.01); *B22F 10/28* (2021.01); *B22F 10/362* (2021.01);
(Continued)

(58) Field of Classification Search
CPC ........ B22F 10/80; B22F 10/28; B22F 10/362; B22F 10/366; B22F 10/364; B22F 12/41;
(Continued)

(56) References Cited

U.S. PATENT DOCUMENTS

2012/0211926 A1\* 8/2012 Larsson ................ B22F 10/362
264/460
2015/0050463 A1 2/2015 Nakano et al.
(Continued)

FOREIGN PATENT DOCUMENTS

DE 102010048335 4/2012
DE 102014208565 2/2015
(Continued)

OTHER PUBLICATIONS

International Search Report for Application No. PCT/EP2019/051224 dated Apr. 8, 2019, 20 pages.
(Continued)

*Primary Examiner* — Michael J Brown
(74) *Attorney, Agent, or Firm* — Polsinelli

(57) ABSTRACT

A method for providing control data to an additive manufacturing device includes a first step of accessing computer-based model data of a partial area of a cross-section of the object, and a second step of generating a data model of the sub-region, by specifying a solidification of the building material by at least one energy beam bundle along at least one solidification path. A plurality of solidification path sections are scanned at least twice with an energy beam bundle and the amount of energy to be introduced during the scanning is specified so that either the amount of energy introduced during the first scanning or a subsequent scanning is is too small to cause a solidification of the building material. In a third step, control data corresponding to the data model generated in the second step are provided for
(Continued)

generating a control data set for the additive manufacturing device.

13 Claims, 5 Drawing Sheets

(51) Int. Cl.
| | |
|---|---|
| *B22F 10/362* | (2021.01) |
| *B22F 10/366* | (2021.01) |
| *B33Y 10/00* | (2015.01) |
| *B33Y 30/00* | (2015.01) |
| *B33Y 50/02* | (2015.01) |
| *B22F 10/364* | (2021.01) |
| *B22F 12/41* | (2021.01) |

(52) U.S. Cl.
CPC ............ *B22F 10/366* (2021.01); *B33Y 10/00* (2014.12); *B33Y 30/00* (2014.12); *B33Y 50/02* (2014.12); *B22F 10/364* (2021.01); *B22F 12/41* (2021.01)

(58) Field of Classification Search
CPC ......... B33Y 10/00; B33Y 30/00; B33Y 50/02; Y02P 10/25
USPC ........................................................ 700/119
See application file for complete search history.

(56) References Cited

U.S. PATENT DOCUMENTS

| | | |
|---|---|---|
| 2016/0332379 A1 | 11/2016 | Paternoster et al. |
| 2018/0193918 A1* | 7/2018 | Griffith .............. G05B 19/4099 |
| 2019/0091935 A1 | 3/2019 | Weichselbaumer et al. |
| 2019/0252152 A1* | 8/2019 | Crosland ............... H01J 37/305 |

FOREIGN PATENT DOCUMENTS

| | | |
|---|---|---|
| DE | 102014201818 | 8/2015 |
| DE | 102016203955 | 9/2017 |
| DE | 102017205051 | 9/2018 |
| DE | 102017205053 | 9/2018 |
| WO | 2016079496 | 5/2016 |
| WO | 2017201120 | 11/2017 |
| WO | 2018172080 | 9/2018 |
| WO | 2018200191 | 11/2018 |

OTHER PUBLICATIONS

Kruth et al.: "Assessing and comparing influencing factors of residual stresses in selective laser melting using a novel analysis method" (English), 12 pages.

Mercelis et al.: "Residual stresses in selective laser sintering and selective laser melting" (English), 32 pages.

* cited by examiner

ADDITIVE MANUFACTURING METHOD WITH CONTROLLED SOLIDIFICATION AND CORRESPONDING DEVICE

TECHNICAL FIELD OF THE INVENTION

The present application relates to a method and a device for providing control data for an additive manufacturing device, a correspondingly adapted additive manufacturing method, a correspondingly adapted device for controlling energy introduction devices in an additive manufacturing device, a correspondingly adapted additive manufacturing device and a correspondingly adapted computer program.

BACKGROUND OF THE INVENTION

Additive manufacturing devices and related methods are generally characterized by the fact that objects are manufactured in them layer by layer by solidifying a shapeless building material. Solidification can be achieved, for example, by supplying thermal energy to the building material by irradiating it with electromagnetic radiation or particle radiation (e.g. laser sintering (SLS or DMLS) or laser melting or electron beam melting). In laser sintering or laser melting, for example, the incidence area of a laser beam on a layer of the building material is moved across those locations of the layer which correspond to the object cross-section of the object to be produced in this layer.

WO 2016/079496 A1 describes a scanning of locations of a building material layer with pulsed laser operation. In particular, it is explained that when solidifying adjacent locations after scanning the first location, sufficient time must elapse so that when solidifying the location adjacent to it, the first location has already cooled down to such an extent that a size of a melt pool does not become too large. To enable that the production process can nevertheless progress rapidly, WO 2016/079496 A1 proposes scanning the building material with the laser beam discontinuously (i.e. with gaps) in a first pass and then scanning the material inside the gaps in a second pass. In particular, a scanning of the building material in a linear way is to be avoided so that the material is irradiated approximately point by point within one pass, wherein the individual points should not be adjacent to each other.

SUMMARY OF THE INVENTION

Although the above-mentioned procedure can lead to a better resolution of details, it cannot yet completely solve the problem of component distortion. The object of the present invention is to provide an alternative and/or improved method and a corresponding device by means of which objects can be produced by an additive manufacturing process, preferably with less distortion.

The object is achieved by a computer-aided method according to claim 1, an additive manufacturing method according to claim 11, a device according to claim 12, a device for controlling energy introduction devices according to claim 13, an additive manufacturing device according to claim 14 and a computer program according to claim 15. Further developments of the invention are claimed in the dependent claims. In particular, a device according to the invention may also be further developed by features of the methods according to the invention as set out below or in the dependent claims and vice versa. Furthermore, the features described in connection with a device can also be used for the further development of another device according to the invention, even if this is not explicitly stated.

A computer-aided method according to the invention for providing control data to an additive manufacturing device for manufacturing a three-dimensional object by means of the same, wherein the object is manufactured by applying a building material, preferably a building material including metal powder or metal alloy powder, layer upon layer and by solidifying the building material by supplying radiation energy to locations in a layer corresponding to the cross-section of the object in that layer by scanning these locations with at least one energy beam bundle in accordance with a set of energy introduction parameters along a number of solidification paths by at least one energy introduction device for introducing energy into the building material, comprises:

a first step of accessing computer-based model data of a partial area of a cross-section of the object, a second step of generating a data model of the partial area, wherein in the data model a solidification of the building material with at least one energy beam bundle along at least one solidification path is specified, wherein it is specified that a plurality of solidification path sections, in particular the total number of solidification paths, are scanned at least twice with an energy beam, wherein the amount of energy to be introduced during the scanning of a solidification path section is specified so that either the amount of energy introduced during the first scanning of this solidification path section or the amount of energy introduced during a subsequent scanning of this solidification path section is too small to be able to cause a solidification of building material by exceeding the melting temperature of the building material within the incidence range of the respective energy beam, and a third step in which control data corresponding to the data model generated in the second step are provided for the generation of a control data set for the additive manufacturing device.

Additive manufacturing devices and processes to which the present invention relates are in particular those in which energy is selectively supplied as an electromagnetic radiation or as a particle radiation to a layer of the building material. The working plane is a plane in which the top surface of the layer to which the energy is applied is located. An energy introduction device is understood to be a device by means of which the position of the impingement of an energy beam on a layer of the building material can be changed, for example a beam deflection device. An energy input device can be connected to a radiation source assigned to it for generating the energy radiation, or several energy input devices can be assigned to one radiation source. In particular, lasers or electron beam sources can be used as radiation sources. A set of energy input parameters contains, for example, power specifications for the radiation source, specifications concerning the focal position of the radiation, the diameter of an energy beam with vertical incidence on the working plane, etc.

In particular, the invention relates to methods and devices in which heat is supplied to the built-up material by means of radiation in order to solidify it, such as laser sintering or laser melting or electron beam melting. Therein the building material is partially or completely melted by means of the energy introduced by the radiation, whereby the components of the building material (for example powder grains) bond together. After cooling, the building material is then present as a solid. Since the transitions between superficial melting (sintering) and complete melting (melting) are gradual, the terms sintering and melting are used synonymously in the present application and no distinction is made between sintering and melting.

An application of the invention in the context of additive manufacturing methods and devices in which a metal-containing constituent material is used, for example a metal powder or metal alloy powder, is of particular advantage.

It should also be noted at this point that, by means of an additive manufacturing device according to the invention, not only one object but also multiple objects can be manufactured simultaneously. Therefore, when the present application refers to the production of an object, it is clear that the description in question is equally applicable to additive manufacturing processes and devices in which multiple objects are produced simultaneously.

A control data set (often referred to as a control instruction set) in this case is a sequence of instructions to apply layers of the constituent material in succession and to scan areas of the respective layers corresponding to the cross-section of an object to be manufactured with energy radiation in order to solidify the building material.

In detail, a control data set is based on a computer-based model of the object or objects to be manufactured, preferably a CAD model. For each layer of building material, the control data set determines in particular the thickness of a layer applied and the locations at which the building material is to be solidified by the introduction of radiation during production. In addition, a control data set often contains information specific to the manufacturing device, for example with regard to the position and orientation of the objects in the additive manufacturing device or with regard to the diameter of an energy beam (bundle) when it is incident on the building material. As a rule, the control data set contains all the data required for controlling an energy introduction device, whereby, among other things, the energy density of the energy radiation, i.e. the energy per unit area, and/or the moving speed of the beam across the building material and/or an irradiation pattern are determined. Here the term "beam bundle" is used instead of " beam" in order to express that the shape of the radiation incidence area on the building material does not necessarily have to be a point shape, but can also be area-shaped, especially if the radiation impinges onto the building material at an angle, or if radiation is used which is deliberately intended to cover a larger area when impinging onto the building material (for example if a line exposer is used).

The control data set can thus be considered as the entirety of all control data specified for the control of the manufacturing process in an additive manufacturing device. The control data related to a single layer is also referred to in the following as layer data set. In the present application it is assumed in particular that a layer data set contains a data model of locations of an object cross section to be solidified during the manufacturing process. Such a data model is usually generated by decomposing a CAD model of the object to be manufactured into layers (in technical language called slicing). However, it is also conceivable to extract a two-dimensional representation of the object cross-section to be consolidated in a layer by means of one or more beam bundles in some other way from the computer-based CAD model of the object. In the layer data set, locations corresponding to an object cross-section which are to be solidified in the associated building material layer are specified. In addition, further information regarding the production of the object cross section can be contained, in particular the time sequence in which locations corresponding to an object cross section are to be solidified, i.e. a scan line or a scanning path along which a solidification is to be carried out, or e.g. the layer thickness or irradiation parameter values such as the diameter or the moving speed of a beam bundle impinging onto the building material, etc. It should be emphasized that a layer data set does not necessarily have to refer to a complete object cross section, but may also refer to a part of it only.

The computer-based model data accessed in the first step may, for example, be a CAD model of at least one portion of the object to be manufactured that contains the partial area. For example, the model data may also be in STL format and may not yet contain information about the division into layers for layer-by-layer manufacture. It is also conceivable that the model data is available in a GML (Generative Modelling Language) description. Alternatively, the model data might also be a number of layer data sets, each of which contains a data model of an area of a building material layer to be selectively solidified during the manufacturing process, which corresponds to a cross-section of the object section. It should be noted that in the present application the term "number" is always to be understood in the sense of "one or more". It should be noted that the model data need not necessarily relate to only one section of the object to be manufactured, but may also cover the whole object to be manufactured.

An access to the model data can be done in such a way that the model data is read from a memory or is received via a network. It is possible that in an upstream step of the procedure according to the invention, the model data for the object section in which the subarea is located is first generated and stored in an internal memory. In particular, the model data of the entire object section do not necessarily have to be read in at once. It is also possible that there is a longer time interval between the access processes to parts of the model data, for example parts of the model data can be read in from a memory (which can also be accessed, for example, from the additive manufacturing device) or via a network as required during a manufacturing process of the object section, and a generated data model is then integrated into the control data set during the manufacturing process. If the model data accessed in the first step already contains a number of layer data sets, then the generation of at least one data model in the second step can consist in the modification of a data model of a building material layer already contained in the model data. Otherwise, a data model of a building material layer (or a part of it) can be generated for the first time in the second step. It should be emphasized that a partial area is understood here as a continuous area.

It shall be mentioned that there may be building materials, such as alloys, for which no clear melting point but a melting interval is defined. In principle, already when the solidus temperature, i.e. the lower limit of the melting interval, is exceeded in such a case, one can speak of partial melting. However, the present invention can preferably be applied to cases in which the built-up material is completely melted, i.e. the liquidus temperature or the upper limit of the melting interval is exceeded.

A solidification path corresponds to a line segment in the working plane along which the building material is to be solidified without temporal and local interruptions (gaps), i.e. in one go. In particular, solidification paths can be regarded as scanning lines or scanning tracks along which the incidence area of an energy beam is moved across the building material in order to solidify the latter and not only to heat it. For example, a solidification path may be a straight line segment of a certain width (the solidification width) along which an energy beam bundle solidifies the building material. However, there are also cases in which one or more changes of direction occur during the movement of an energy beam bundle along the solidification path, in particular where the solidification path is geometrically a curved line of a certain width (the solidification width).

On the one hand, the solidification paths may extend inside an object cross section, i.e. they may not run along the contour (i.e. the edge) of the object cross section. This is the case, for example, with the so-called "hatching", in which an energy beam is usually moved along solidification paths that are essentially parallel to each other within a partial area to be solidified, similar to hatching of the partial area. At one end of the solidification path, i.e. in particular at the location where the solidification path meets the edge of the partial area, a jump to the next, in particular adjacent, solidification path takes place. A special type of hatching is the so-called "onion hatching", in which an energy beam bundle is moved across the building material in lines parallel to the contour of an object cross section or a partial area.

Especially if the solidification paths are not in the form of closed paths, but rather line segments of a certain (limited) length, then it is advisable to implement a repetition of the scanning in such a way that individual solidification paths are scanned again in their entirety (i.e. along their entire length). From this follows a variety of possibilities, which solidification paths are resampled and in which order they are sampled. The order may, for example, be selected depending on the order in which the solidification paths were scanned in a previous scan.

If solidification paths extend along the contour of an object cross section or along closed paths, then the invention may be implemented in such a way that individual sections of a solidification path (solidification path sections) are repeatedly scanned. It should be noted that such a repetition of scanning only sections of a solidification path is of course also possible in the case in which the solidification paths are the above mentioned line segments of a limited length (e.g. hatch lines).

Furthermore, the strategy for the rescanning of locations may depend on the length of the scanned solidification paths (e.g. hatch vectors) or sections of a solidification path during a previous scan of these points.

Preferably, the repeated scanning of solidification path sections follows a repeating temporal and/or local pattern. In other words, it is not simply rescanning a solidification path section that has a fixed distance to another previously scanned solidification path section. Rather, a repetitive scanning of e.g. several solidification path sections is performed simultaneously or a solidification beam bundle is used alternately (following a certain pattern) for the initial scanning of solidification path sections and the repeated scanning of other solidification path sections.

An incidence area of an energy beam bundle on the building material may be considered as an area of the working plane within which the incident radiation power per unit area is greater than a predetermined percentage of the maximum radiation power per unit area where the energy beam impinges on the surface of the building material layer. For example, those locations where only 1% of the maximum radiation power per unit area is incident may be considered as the border of the incidence area. Which percentage is applied here does not have a limiting effect on the idea of the invention. Especially in the case of a Gaussian-shaped beam profile, for example, also those points at which the maximum radiation power per unit area has fallen to $1/e$, $1/e^2$ etc. may be regarded as the limit of the incidence area.

The way in which the scanning process takes place in detail is not restrictive for the idea of the present invention, as long as only the scanning always takes place along linear segments, i.e. not pointwise. Furthermore, it is not necessarily necessary to scan all the locations of the partial area at least twice. Depending on the shape of the partial area and the building material used, multiple scanning of only a part of the locations may be sufficient.

The repeated scanning process does not necessarily have to take place exactly on a previously scanned solidification path. Rather, a slight offset perpendicular to the direction of movement is also possible as long as the subsequent scanning is able to change the temperature of the building material along the solidification path. In this case, the resampled solidification path section does not extend across the full width of the solidification path, but may extend across the full length of the solidification path.

Finally, it should be noted that the control data provided for the generation of a control data set may consist of the at least one data model generated in the second step itself, but the at least one data model can also be prepared according to the format requirements for integration into the control data set.

The inventors have found that distortion in objects manufactured by means of additive manufacturing devices is caused, among others, by too rapid temperature changes during heating and cooling of the building material. The method just described makes it possible to supply energy to the building material in a more controlled way in order to solidify it. By scanning locations in the partial area at least twice with an energy beam, the heating of the building material and/or cooling of the building material may be less abrupt. The aim here is not to melt the building material several times, but to supply energy before the actual solidification process (pre-heating) or after the energy introduction for solidifying (i.e. at least partial melting) the building material (controlled cooling).

After the energy for melting the building material has been introduced into the building material within the incidence area of an energy beam bundle, the cooling process of the at least partially melted building material should preferably not be too abrupt. In particular, if an energy beam bundle introduces the majority of the energy required for melting, which is often the case for metal-containing building material, there is a large temperature difference between the incidence area of the energy beam bundle and the environment. As a result, a cooling process may occur so quickly that inhomogeneities, for example in the temperature curves, the structural structure of the three-dimensional object or the composition of the building material during a (build-up) melting or solidification process (e.g. a metal alloy which could partially segregate locally in the melt), occur within the incidence area, i.e. the building material in particular solidifies too quickly, i.e. changes into a solid state. The cooling process is prolonged by the process described, so that a more controlled temperature equalization may take place within the incidence area and its surroundings. With the described procedure, in particular when a previously scanned location is scanned again, at which the building material has previously been at least partially melted, only enough energy per unit area is introduced to prevent the building material from melting again, i.e. the amount of energy per unit area introduced by the energy beam bundle is not sufficient on its own to allow the melting temperature of the building material to be exceeded within the incidence area of the energy beam bundle. The reason for this is that although the cooling process of the building material should take place in a more controlled manner, it should not be extended too long, so that the manufacturing time for the objects is not extended too much.

By preheating the building material with an energy beam bundle, the building material is brought to a temperature that is still below the melting temperature of the building material. This may even go as far as "pre-sintering", in which partial areas of the building material, for example surface areas of powder grains of a powdery building material, are melted, but not the complete building material, in this example the complete powder grain, melts. "Below the melting temperature" in this context means that a melting temperature is applied which is required to completely convert a predefined volume unit (e.g. a standard size of a powder grain) of the building material into the liquid state. In other words, what is considered as the melting temperature sometimes depends (especially during controlled cooling) on the additive manufacturing process and/or the building material used. Alternatively, the building material is brought to a temperature that does not produce such pre-sintering. In any case, preheating reduces the temperature jump that occurs during subsequent scanning with an energy beam bundle to melt the building material. As a consequence, the temperature in the incidence area of the energy beam bundle is more homogeneous during the melting process and furthermore, temperature differences to the surrounding area of the incidence area of the energy beam bundle are smaller, which leads to slower cooling and thus to lower temperature-related stresses and thus to less distortion of the manufactured object.

In particular, the described procedure may vary the time between successive scans of a location. Thus, a different heat dissipation behavior of the surroundings of different locations may be taken into account. The heat dissipation behavior depends, for example, on how much unsolidified building material is in the vicinity of a location. Furthermore, it depends on how many locations in the vicinity of a location have already been supplied with energy by an energy beam bundle. As an option, the appropriate time for preheating or controlled cooling may be set individually for each location without having to set the energy to be applied per unit area individually.

In particular, the energy beam bundle may be moved at the same speed across a location to be scanned as it would be during a subsequent or preceding scanning process of this location. This may avoid a complicated adjustment of the energy to be supplied per unit area to the scanning speed. In general, it is possible to select a different scanning speed for a repeated scanning operation, but this is not intended.

Preferably, it is specified in the second step for the first scanning and a subsequent scanning of a solidification path section that an energy beam bundle is used which is moved across the building material by one and the same energy input device.

When preheating or controlled cooling is accomplished with the aid of only one energy introduction device, then it is particularly easy to implement the method according to the invention on existing additive manufacturing devices without having to make expensive structural modifications to the device. In principle, it is then sufficient to provide the additive manufacturing device with control data provided in accordance with the invention for controlling the manufacturing process. If an existing additive manufacturing device already contains a plurality of energy introduction devices, then the provision of control data provided according to the invention may also be sufficient to implement the procedure, but in such a case the coordination of the energy introduction devices is more complex, whereby on the other hand the manufacturing process may be faster.

Preferably, the solidification path sections scanned at least twice extend across the entire length of the solidification path.

Especially if solidification paths are scanned several times as a whole, the procedure may be easily implemented. An example is the repeated scanning of scan lines (hatch lines). If, for example, a subsequent scanning of hatch lines is laterally offset from the previous scanning, only a section of a solidification path (namely the area of intersection of the scan line of the previous scanning with that of the subsequent scanning) is scanned several times.

Preferably, it is specified in the second step (S2) that a process of scanning solidification path sections, in particular the first scanning process, is interrupted in order to scan solidification path sections already scanned again during the interruption with an energy beam bundle.

In such a procedure it is possible, among other things, to do with only a small number of energy introduction devices, in particular only one energy introduction device. If several energy introduction devices are used, the interruption of the scanning process may be used to give the building material time to cool down to avoid overheating. Interruption of the scanning process means in particular that, for example, when hatching, a scanning hatch line by hatch line is interrupted time in order to rescan hatch lines that have already been scanned in the meantime or to skip hatch lines directly adjacent to the currently scanned hatch line and, for example, to continue scanning at another location. In other words, a preceding scanning process (the first, second, third, etc. scanning) is interrupted in order to temporarily start a (further) repeat scanning process (the second, third, fourth, etc. scanning) at other solidification path(s) or a first scanning pass at another location.

Preferably, it is specified in the second step that the time interval between successive scans of each solidification path section during a repeated scan is different from the time interval between successive scans of the same solidification path section during a previous scan.

In the procedure described above, when scanning the building material to preheat it or scanning the building material to cause controlled (delayed) cooling of it, not all those locations which are solidified are scanned. As a result, the duration of the pre-heating or controlled cooling is reduced and the time required for the manufacturing process is shorter. If, for example, the solidification paths are hatch lines, only every nth hatch line, e.g. only every third, would be scanned for preheating or controlled cooling.

Preferably, the time interval of successive scanning processes in repeated scanning is chosen depending on the length of the solidification path sections in a previous scanning.

If adjacent solidification paths are short, i.e. the length of the gap-free or uninterrupted movement path is short, more energy per time unit is locally introduced into the building material, since the time after which the energy beam bundle comes again close to a location already scanned is short. Since there is less time available to remove the thermal energy, the temperature will therefore be higher for short solidification paths than for longer solidification paths. For a better homogeneity in the manufacture of the object, the shorter the solidification path lengths, the greater the distance between the scanning tracks may be when scanning again. Other input variables such as scanning speed or power of the energy introduction device may also be taken into account when selecting this distance between scanning tracks. With regard to the possibilities of taking the length of the scanning tracks into account when specifying the scanning process, in particular when determining the distance between the scanning tracks, reference is made here to the disclosure of the patent application filed by the applicant with the German Patent and Trade Mark Office under file number 10 2017 207 264.4.

In particular, it may be specified in the second step in the data model that for the partial area of an object cross section it is checked whether the scanning time required for scanning the building material along a scan line falls below a specified minimum time $t_{min}$ and if this is determined for a scan line, either a reduced energy density of the energy beam bundle is specified during the scanning of the building material along this scan line and/or a waiting time is specified after the scanning along the scan line before the energy beam is moved along a further scan line, the reduced energy density of the energy beam bundle being specified in such a way that the more the predetermined minimum time $t_{min}$, is dropped below, the lower the energy density of the energy beam bundle is specified.

In particular, it may be checked in the second step whether, in the case of two scan lines lying next to each other, the predetermined minimum time duration $t_{min}$ is dropped below by different amounts and, if this is the case, it may be checked which of the two scan lines is to be scanned later, wherein a first reduced energy density E1 is specified for the scan line to be scanned first in time and a second reduced energy density E2 is specified for the scan line to be scanned later in time, wherein the first and second reduced energy densities E1 and E2 are specified so that, in the case where a sampling time $t_{A2}$ for the scan line to be sampled later in time is less than a sampling time $t_{A1}$ for the scan line to be sampled first in time, the amount of the difference between the first and second reduced energy densities |E1−E2| is less than in the case where a sampling time $t_{A2}$ for the scan line to be sampled later in time is greater than a sampling time $t_{A1}$ for the scan line to be sampled first in time.

Preferably, in the case that it is determined that the minimum time $t_{min}$ for a scan line has not been reached, a waiting time may be inserted before or after the scanning of the building material along this scan line, the waiting time corresponding at most, preferably exactly, to the difference between the minimum time $t_{min}$ and the time for scanning this scan line.

Further preferably, in the case that it is determined that for a scan line, the minimum time duration $t_{min}$ is dropped below, a waiting time before or after the scanning of the building material along this scan line may be specified and during the waiting time a scanning of the building material by the energy beam bundle along at least one further scan line may be specified.

Preferably it is specified in the second step that the at least one energy beam bundle is moved along solidification path sections which are preferably substantially parallel to each other.

The described procedure is particularly suitable for "hatching", in which an energy beam bundle is usually moved along essentially parallel or antiparallel solidification paths within a partial area, similar to a hatching of the partial area. At one end of a solidification path, i.e. in particular where the solidification path meets the edge of a (usually stripe-shaped) region, a jump to the next, in particular adjacent, solidification path is performed. The next solidification path may be scanned either in the same direction of motion or in an opposite direction. Since in practice the solidification paths may not always be selected as strictly parallel, it is assumed that the solidification paths are essentially parallel to each other. In general, a stripe-shaped area may be defined as a geometric shape in which at least two, preferably a plurality of (i.e. more than 10) hatch lines as described above are positioned next to each other, whereby the hatch lines do not necessarily have to have the same length dimension. Therefore, before another stripe-shaped area is scanned with the energy beam bundle, preferably all the hatch lines in the currently scanned stripe-shaped area are scanned.

It should also be mentioned that if a repeated scanning of solidification paths is performed in the same scanning direction as a previous scanning, it becomes possible to select the same time interval between successive scans for all the locations of a solidification path, which helps to homogenize the material properties, since the temperature curves are equalized with the time of the individual locations of a solidification path.

Preferably, it is specified in the second step that already before the completion of the first scanning of all locations of the partial area with an energy beam bundle, a repeated scanning of locations of the partial area with an energy beam bundle is performed.

When proceeding according to the invention, it does not necessarily make sense to first scan all locations of a partial area with an energy beam bundle before individual locations are scanned again. Thus, a scanning strategy is chosen in which the temperatures of individual locations of the partial area may be corrected automatically at short term and without time-consuming measurements.

Further preferably, it is specified that after the amount of energy introduced by an energy beam bundle at a location has led to the melting temperature of the building material within the incidence area of the energy beam being exceeded, the energy introduction per unit area drops monotonously at this location during subsequent scanning processes.

Especially if locations are scanned more than twice, this procedure allows for a particularly careful control of the cooling of these locations. For this purpose, after an energy introduction per unit area at a location which leads to the melting temperature of the building material within the incidence area of the energy beam bundle being exceeded, the energy introduction per unit area is reduced monotonically, preferably strictly monotonically, in subsequent scanning processes so that the at least partially melted building material may cool down slowly and in a controlled manner in order to reduce the temperature differences to the environment of the component in a more controlled manner and thus, among other things, to ensure lower stresses in the component.

Further preferably, it is specified that at one location the energy per unit area introduced by an energy beam bundle is too low to be able to cause the melting temperature of the building material within the incidence area of the energy beam bundle to be exceeded and that the energy introduction per unit area increases monotonically during repeated scanning processes of this location until during one scanning process the melting temperature of the building material within the incidence area of the energy beam bundle is exceeded for the first time.

In this procedure, the locations of the partial area are first preheated by scanning with an energy beam bundle, so that during the scanning process in which at least partial melting of the building material takes place, a lower energy introduction per unit area has to take place than without a previous heating of the locations. This leads to less distortion of the manufactured objects due to lower temperature differences in the component. A particularly careful heating of the building material is possible in particular if the locations of the partial area are scanned more than twice and the energy introduction per unit area is increased from scanning process to scanning process, whereby of course there has to be a scanning process in which the melting temperature of the building material is exceeded in the incidence area of the energy beam bundle.

In particular, such a stepwise heating may be combined with a stepwise cooling described above.

In an additive manufacturing method according to the invention for manufacturing a three-dimensional object by means thereof, wherein the object is manufactured by applying a building material, preferably a building material including metal powder or metal alloy powder, layer by layer and solidifying the building material by means of supplying radiation energy to locations in a layer, corresponding to the cross section of the object in this layer, by scanning these locations with at least one energy beam bundle according to a set of energy introduction parameters by at least one energy introduction means for introducing energy into the building material, the flow of the additive manufacturing process is controlled by a control data set generated using a process according to the invention.

If control data provided according to the invention are used in a control data set generated for the control of an additive manufacturing process, in particular the control of a layer-by-layer additive manufacturing process using a metal-containing building material, such as a powder melting or sintering process, such as SLS or DMLS, then the three-dimensional object produced by the additive manufacturing process may be manufactured with greater quality using such a procedure.

A device according to the invention for providing control data to an additive manufacturing device for manufacturing a three-dimensional object by means of the same, wherein the object is manufactured by applying a building material, preferably a building material including metal powder or metal alloy powder, layer upon layer and solidifying the building material by supplying radiation energy to locations in a layer corresponding to the cross-section of the object in that layer by scanning these locations with at least one energy beam bundle according to a set of energy introduction parameters along a number of solidification paths by at least one energy introduction device for introducing energy into the building material, comprises:

a data model access unit adapted to access computer-based model data of a partial area of a cross-section of the object, a data model modifying unit adapted to generate a data model of said partial area, said data model specifying a solidification of said building material with at least one energy beam bundle along at least one solidification path, wherein it is specified that a plurality of solidification path sections, in particular the total number of solidification paths, are scanned at least twice with an energy beam bundle and the amount of energy to be introduced during scanning of a solidification path section is specified so that either the amount of energy introduced during the first scanning of this solidification path section or the amount of energy introduced during a subsequent scanning of this solidification path section is too small to be able to cause solidification of building material by exceeding the melting temperature of the building material within the incidence area of the respective energy beam bundle, and a control data providing unit adapted to provide control data corresponding to the data model modified by the data model modifying unit for generating a control data set for the additive manufacturing device.

The provision of a data model generated in the second step of the method according to the invention for the generation of a control data set may be effected by the control data providing unit itself by integrating the generated data model into a control data set for the additive manufacturing device. However, providing also includes forwarding the data model to a data processing device, which integrates the data model into a control data set, or direct forwarding to an additive manufacturing device. In particular, it is possible during a manufacturing process in the additive manufacturing device to provide it dynamically with data models for object cross-sections still to be manufactured. In particular, data models created in the second step do not have to be provided individually for an additive manufacturing process. Rather, several generated data models may be collected first and then made available in their entirety for integration into a control data set.

A device according to the invention for computer-aided control of a number of energy introduction devices of an additive manufacturing device for manufacturing a three-dimensional object by means of the same, wherein the object is produced by applying a building material, preferably a building material including metal powder or metal alloy powder, layer upon layer, and solidifying the building material by means of supplying radiation energy to locations in a layer corresponding to the cross-section of the object in said layer, by scanning these locations with at least one energy beam bundle for introducing energy into the building material according to a set of energy introduction parameters along a number of solidification paths, is designed in such a way that a plurality of solidification path sections, in particular the total number of solidification paths, is scanned at least twice with an energy beam bundle, and the amount of energy to be introduced during scanning of a solidification path section is specified so that either the amount of energy introduced during the first scanning of this solidification path section or the amount of energy introduced by a subsequent scanning of this solidification path section is too small to be able to cause solidification of building material by exceeding the melting temperature of the building material within the incidence area of the respective energy beam bundle.

In particular, a part of the control device of an additive manufacturing device in combination with corresponding drivers of the number of energy introduction devices may be regarded as a device for computer-aided control of a number of energy introduction devices. In particular, such a device is designed in such a way that it carries out the control in accordance with the control commands which are present in a control data set for the generation of which control data have been provided in accordance with the invention. In such a device it is basically possible to realize all the components of the device by means of software. Of course, an alternative realization by means of hardware alone or by means of a mixture of software and hardware components is possible in the same way.

An additive manufacturing device according to the invention for manufacturing a three-dimensional object, wherein the object is manufactured by applying a building material, preferably a building material including metal powder or metal alloy powder, layer by layer and solidifying the building material by means of supplying radiation energy to locations in a layer corresponding to the cross-section of the object in this layer, by scanning these locations with at least one energy beam bundle in accordance with a set of energy input parameters along a number of solidification paths by at least one energy introduction device for introducing energy into the building material, includes a device in accordance with the invention for computer-aided control of a number of energy introduction devices and/or is connected in terms of signal technology to a device in accordance with the invention for computer-aided control of a number of energy introduction devices.

With such an additive manufacturing device it is possible to manufacture components with higher quality, since the temperature differences and thus also the stresses within an object are reduced during its manufacture.

A computer program according to the invention comprises program code means for executing all the steps of a method according to the invention for providing control data or an additive manufacturing method according to the invention when the computer program is executed on a data processor, in particular a data processor cooperating with an additive manufacturing device.

"Interacting" here means that the data processor is either integrated into the additive manufacturing device or may exchange data with it. The implementation of the method according to the invention for the provision of control data as well as the associated device by means of software enables an easy installation on different computer systems at different locations (for example, at the creator of the design of the object or the operator of the additive manufacturing device).

BRIEF DESCRIPTION OF THE DRAWINGS

Further features and functionalities of the invention result from the description of implementation examples using the enclosed figures.

DETAILED DESCRIPTION OF THE EMBODIMENTS

Figure 1:
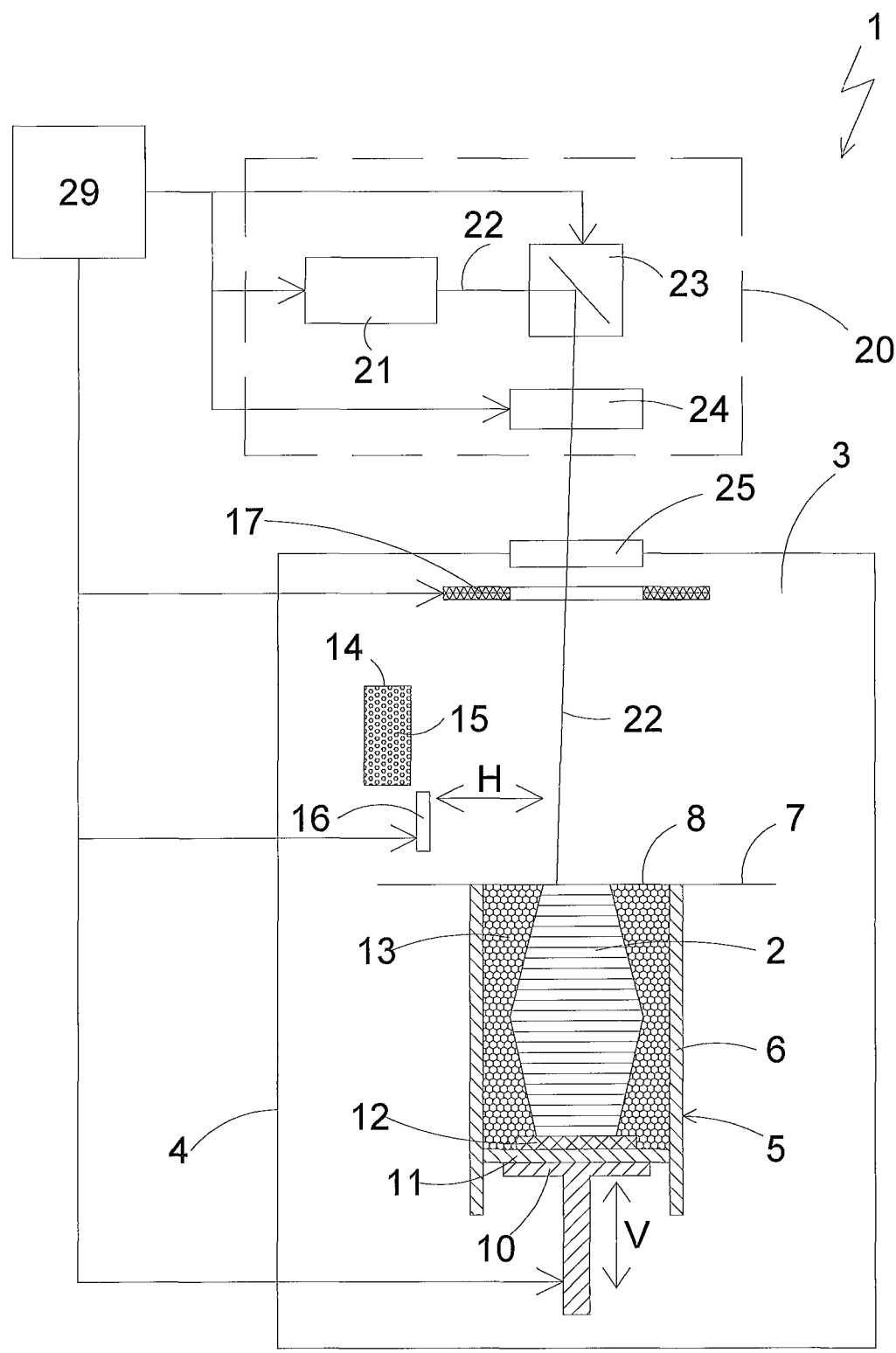
FIG. 1 shows a schematic view, partially shown as a section, of an exemplary device for the additive manufacturing of a three-dimensional object according to an embodiment of the invention, FIG. 2 schematically shows an option of the procedure according to the invention for the example of scanning a stripe-shaped area by means of hatch vectors, FIG. 3 schematically shows another option of the procedure according to the invention for the example of scanning a stripe-shaped area by means of hatch vectors, FIG. 4 schematically shows yet another option of the procedure according to the invention for the example of scanning a stripe-shaped area by means of hatch vectors, FIG. 5 schematically shows an example of a procedure for the solidification of a stripe-shaped partial area of an object cross section.

For a description of the invention, an additive manufacturing device by means of which the invention can be implemented shall first be described below using the example of a laser sintering or melting device with reference to FIG. 1.

For building an object 2, the laser sintering or laser melting device 1 includes a processing chamber or building chamber 3 having a chamber wall 4. A container 5 which is open at the top and which has a container wall 6 is arranged in the processing chamber 3. The upper opening of the container 5 defines a working plane 7, wherein the section of the working plane 7 lying within the opening that can be used for building the object 2 is referred to as a build area 8.

A support 10, which is movable in a vertical direction V and onto which a base plate 11 is attached which closes the container 5 downwards and thus forms the bottom of the latter, is disposed in the container 5. The base plate 11 may be a plate which is formed separately from the support 10 and which is attached to the support 10, or it may be formed so as to be integral with the support 10. Depending on the powder and process used, a building platform 12 on which the object 2 is build may also be attached to the base plate 11 as a building base. However, the object 2 may also be built on the base plate 11 which then itself serves as the building base. In FIG. 1 the object 2 which is to be formed in the container 5 on the building platform 12 is illustrated below the working plane 7 in an intermediate state, having a plurality of solidified layers and being surrounded by building material 13 remaining un-solidified.

The laser sintering or melting device 1 further comprises a storage container 14 for a building material 15, in the present example a powder that is solidifiable by electromagnetic radiation, and a recoater 16 that is movable in a horizontal direction H, for applying the building material 15 within the build area 8. Optionally, heating device, e.g. a radiation heater 17, is arranged in the processing chamber 3 for heating the applied building material 15. An infrared lamp may for example be provided as the radiation heater 17.

The exemplary additive manufacturing device 1 further comprises an energy introduction device 20 having a laser 21 which generates a laser beam 22 which is deflected by way of a deflecting device 23 and which is focused by way of a focusing device 24 via a coupling window 25 provided at the top of the processing chamber 3 in the chamber wall 4 onto the working plane 7.

In laser sintering or laser melting, one or more energy introduction devices may be associated with, for example, one or more gas or solid-state lasers or any other type of laser such as laser diodes. In particular, the use of VCSELs (Vertical Cavity Surface Emitting Laser) or VECSELs (Vertical External Cavity Surface Emitting Laser), or a laser line is also possible and covered by the invention. The specific construction of a laser sintering or melting device shown in FIG. 1 is therefore only exemplary for the present invention and can of course also be modified, especially when using an energy introduction device different from the one shown. In order to make it clear that the shape of the incidence area (target area) of the radiation on the building material may not necessarily be approximately point-shaped, but also area-shaped, the term "beam bundle" is often used in this application synonymously with "beam".

The laser sintering device 1 further comprises a control unit 29 by way of which the individual components of the device are controlled in a coordinated manner for carrying out the building process. As an alternative, the control unit may partially or entirely be arranged outside of the device. The control unit may include a CPU, the operation of which is controlled by a computer program (software). The computer program may be stored on a storage medium separate from the device, from where it may be loaded (for example via a network) into the additive manufacturing device, especially into the control unit.

In operation, the control device 29 lowers the carrier 10 layer by layer, the recoater 16 is controlled to apply a new powder layer and the deflecting device 23 and, if necessary, also the laser 21 and/or the focusing device 24 are controlled to solidify the respective layer at the locations corresponding to the respective object by means of the laser by scanning these locations with the laser.

All further explanations do not only apply to laser sintering or melting devices, but also to other types of additive manufacturing devices in which thermal energy is introduced into the building material in the form of radiation.

In the additive manufacturing device just described as an example, a manufacturing process is carried out in such a way that the control unit 29 processes a control data set.

The control data set instructs an energy input device, in the case of the above laser sintering or laser melting device especially the deflecting device 23, for each time point to which location on the working plane 7 energy radiation is to be directed.

Figure 6:
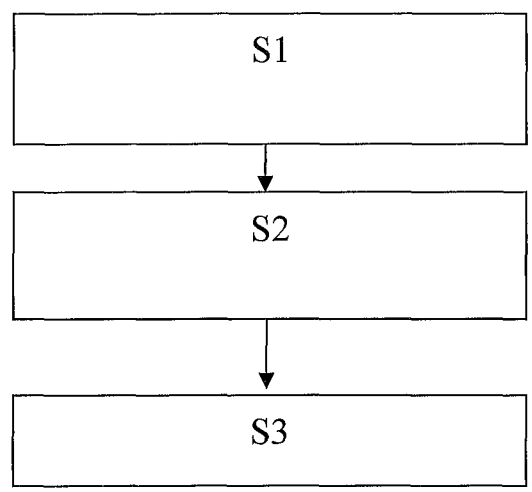
FIG. 6 illustrates the flow of a procedure for providing control data.
Figure 7:
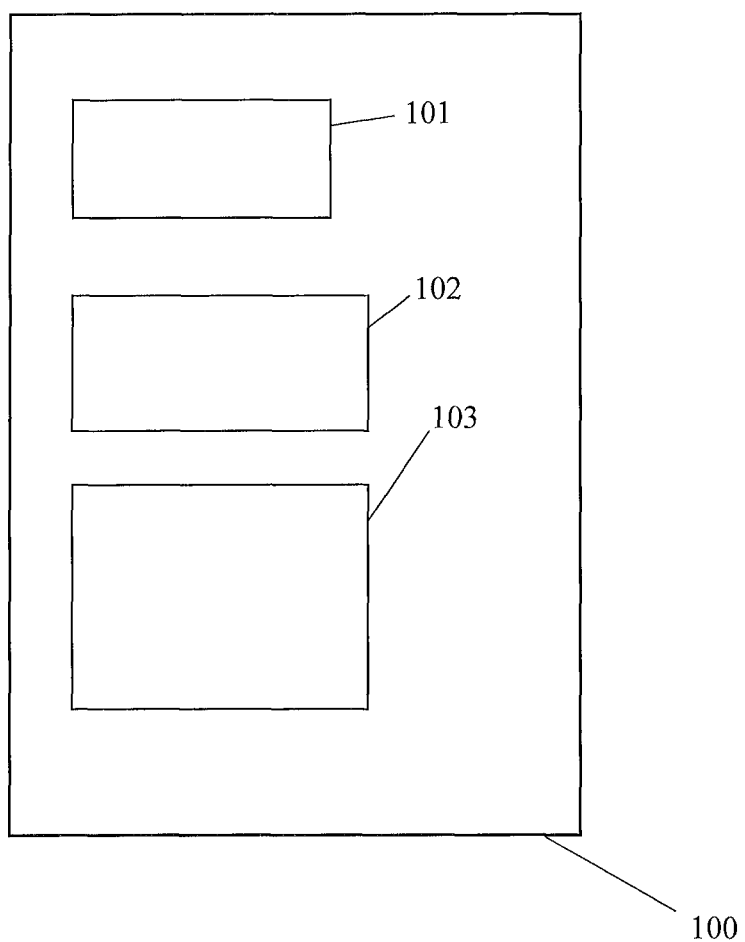
FIG. 7 shows the schematic structure of a device for providing control data.

As shown in FIG. 7, a device 100 for providing control data to an additive manufacturing device includes a data access unit 101, a data model generation unit 102 and a control data provision unit 103. The operation of the device 100 for providing control data is described with reference to FIG. 6.

In the device 100 shown in FIG. 7 for providing control data for an additive manufacturing device, the data access unit 101 first accesses computer-based model data of a partial area of a cross-section of the object to be manufactured. For example, the data access unit 101 accesses a number of layer data sets, each of which comprises a data model of a portion of an object cross section to be selectively solidified during manufacture, preferably of the entire object cross section to be solidified, which is associated with a building material layer. In the process flow shown in FIG. 6, this is step S1.

In step S2 shown in FIG. 6, the data model generation unit 102 now specifies in a data model of a (partial area of an) object cross-section a temporal sequence of the solidification of locations of a built-up material layer assigned to this object cross-section. In other words, a movement of the one or more energy beam bundle(s) used in the additive manufacturing apparatus along scan lines across the building material is determined.

Figure 5:
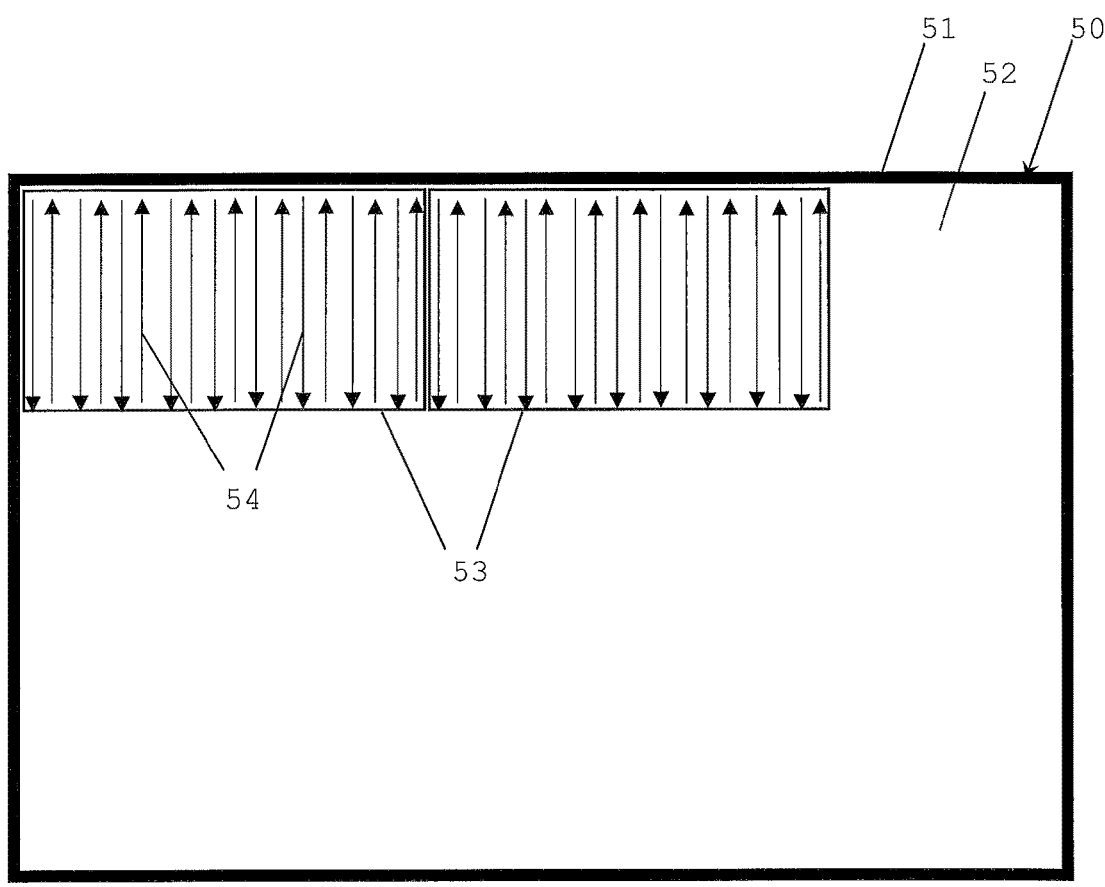

FIG. 5 shows partial areas 53 of the object cross-section, which in the example are stripe-shaped, i.e. rectangular, and which are scanned scanning line by scanning line by moving an energy beam bundle. In the example of FIG. 5, the object cross-section 50 consists of an inner area or core area 52 and a contour area 51. The core area or inner area 52 is usually scanned with energy radiation in such a way that the material is solidified area by area, i.e. partial area 53 by partial area 53. The movement of the energy beam bundle within the partial areas 53 along parallel scanning lines or hatch lines or solidification paths 54 is usually called "hatching". The arrows in FIG. 5 are intended to illustrate the direction of movement of the energy beam across the building material layer. It can be seen in FIG. 5 that two adjacent hatch lines or solidification paths 54 are always scanned in opposite directions. Such a procedure has speed advantages, because the path of the energy beam bundle across the building material without introduction of energy (at the reversal points of the direction of movement) can be short. Alternatively, it is also possible that all the hatch lines are scanned in the same direction.

In the following, the invention is explained on the basis of the strategy illustrated in FIG. 5 for the solidification of areas of a built-up material layer. Each location to be solidified is scanned at least twice with an energy beam, e.g. a laser. The procedure is described in detail in FIGS. 2 to 4, which provide examples of how a time sequence of scanning can be determined in the second step S2. It is initially assumed here that the method is used for a more controlled cooling of the building material after an at least partial melting process. However, the proposed time sequences for scanning the locations of the building material can be applied in the same way to cases in which, before the actual melting process of the building material at one location, pre-heating of this location is to be carried out with an energy beam (bundle), e.g. a laser beam. To simplify the explanation it is assumed that only one energy beam is used.

Figure 2:
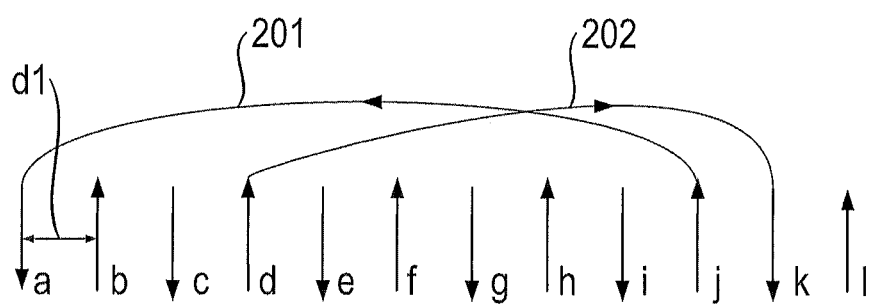

In the example of FIG. 2 scan lines or solidification paths a to l, which each have a distance d1 from each other, are shown. The sequence of letters a to l shall illustrate the temporal sequence in which the solidification paths are scanned for the first time with an energy beam bundle, e.g. a laser beam. It can be seen in FIG. 2 that the solidification paths a to j are scanned first. Thereby, so much energy per unit area is introduced that an at least partial melting of the built-up material takes place, i.e. the melting temperature of the built-up material is exceeded within the incidence area of the energy beam (bundle), e.g. a laser beam.

Thereupon, after the scanning process along the solidification path j has been completed, the laser beam jumps to the beginning of the solidification path a in a jump process 201. The solidification paths a to d are then scanned again in the sequence a, b, c, d. This prevents the building material, which has already been scanned once along these solidification paths, from cooling down too quickly. The energy per unit area introduced during the repeated scanning process is determined in such a way that the amount of energy per unit area introduced by the laser beam is not sufficient on its own to cause the melting temperature of the building material to be exceeded within the incidence area of the laser beam. In other words, if the building material is no longer in the liquid state, the amount of energy per unit area introduced during the second scanning in particular is not capable of returning the building material to the molten, i.e. liquid, state.

The purpose of the second scanning process is to delay a cooling process in order to reduce stresses and thus avoid cracks in the material. Then the laser beam is moved in a second jump 202 from the end of the solidification path d to the beginning of the solidification path k. Now the solidification path k, which has never been scanned before in the example, is scanned with the laser beam in such a way that the building material is at least partially melted along the solidification path k, i.e. the melting temperature (or the solidus or liquidus temperature, depending on the application) of the building material is exceeded within the incidence area of the laser beam. The scanning process is now continued with the solidification paths I, m and n (the last two are not shown), before another jump back (this time to the solidification path e) occurs, and so on.

With the procedure described above, the solidification path a is scanned again after a period of time that corresponds to the time required to scan lines b to j plus the time required for the return 201. In other words, the locations of the building material along the solidification path already had the opportunity to cool down for this time.

After the data model generation unit 102 has generated a data model in which a scanning of locations of the partial areas of an object cross-section is specified according to the described procedure, the data model generated in step S2 is finally made available for the generation of a control data set in a step S3 shown in FIG. 6 by the shift data set provision unit 103 (see FIG. 7). The provision can consist of integrating the generated data model into a control data set for the additive manufacturing device, which is used as the basis for controlling an additive manufacturing process, preferably by a control device in the additive manufacturing device. The latter step may be so that the control device accesses the control data set stored in a memory by means of a data processor therein and causes the conversion of the corresponding control commands. The part of the control device which, in combination with corresponding drivers, controls the number of energy introduction devices can be regarded as a device for computer-aided control of the number of energy introduction devices.

Figure 3:
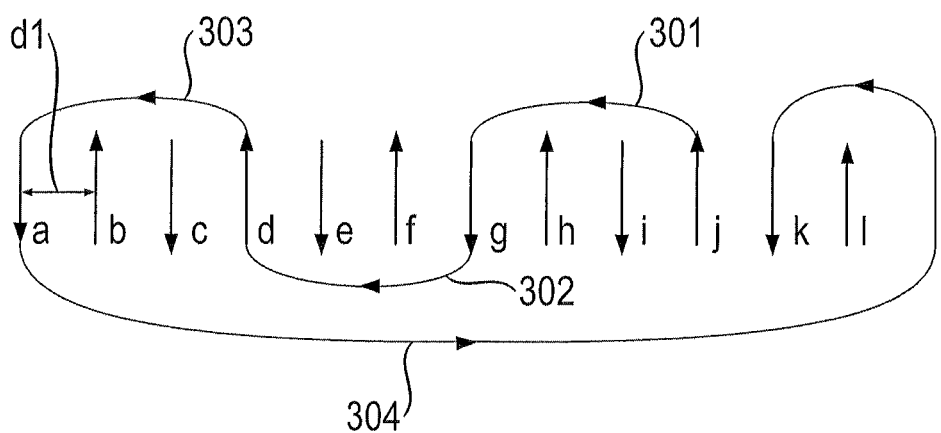

FIG. 3 shows an alternative procedure. As in FIG. 2, FIG. 3 shows the solidification paths a to l, wherein the letters have the same meaning as in FIG. 2. In the example in FIG. 3, a first scanning along the solidification paths a to j is carried out. The laser beam then jumps in a jump 301 to the beginning of the solidification path g. After this has been scanned a second time (with reduced energy per unit area), a jump 302 to the beginning of the solidification path is carried out. After the solidification path d has been scanned a second time (with reduced energy per unit area compared to the first scanning process), a jump 303 to the beginning of the solidification path a is carried out. After the solidification path a has also been scanned a second time, a jump 304 to the beginning of the solidification path k is carried out, so that this path is subsequently scanned in a first scanning process with such an energy per unit area that the building material at least partially melts along the solidification path k.

In the example in FIG. 3, in contrast to FIG. 2, a jump-back 301, 302, 303 occurs only across three solidification paths. Furthermore, in a series of successive jumps back, only every fourth solidification path or hatch line is scanned again.

Figure 4:
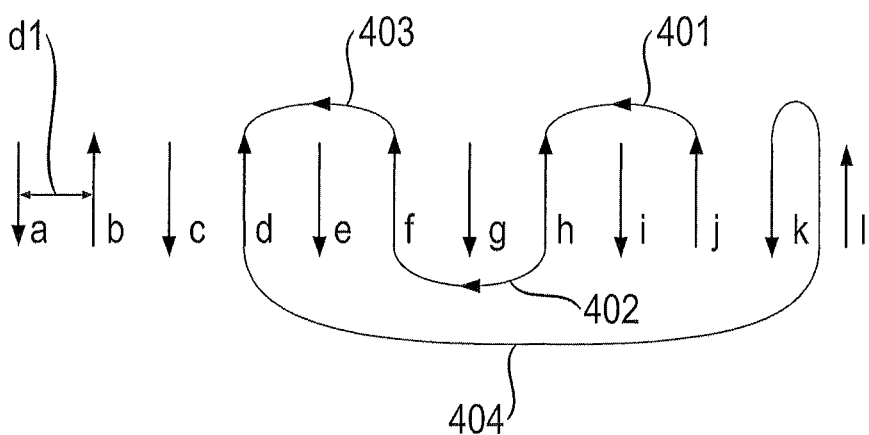

The example shown in FIG. 4 is intended to make it clear that the direction in which the solidification paths were scanned in a previous scanning process does not necessarily have to be maintained in a subsequent scanning process. Although the inventors have found that retaining the scanning direction offers certain advantages, since the heating of the built-up material takes place in the same temporal sequence as in a previous scanning process, scanning against the scanning direction of a previous scanning process also leads to an improvement in component quality. The example of FIG. 4 shows a case in which a first scanning of the solidification paths a to j has already been carried out (again with at least partial melting of the building material) and a repeated scanning of the solidification paths a to c has already been carried out. Starting from this state, the laser beam jumps back in a jump 401 after scanning the solidification path j to the end of the solidification path h, which is then scanned (opposite to the scanning direction the first time) with a reduced energy input per unit area. Thereupon the laser beam jumps back in a jump 402 to the beginning of the solidification path f, which is also scanned a second time with reduced energy introduction per unit area, whereupon in a jump 403 the laser beam jumps to the end of the solidification path d, which is then scanned in the second scanning process opposite to the scanning direction in the first scanning process. Finally, in a jump 404, the laser beam jumps to the beginning of the solidification path k, which is then scanned for the first time (again with sufficient energy for at least a partial melting of the building material). In the further course of the process, scanning processes of the solidification paths i, g, e and l, etc. are carried out.

The examples of a procedure according to the invention given in FIGS. 2 to 4 are only representative of a plurality of options for the selection of the scanning direction and the solidification paths to be scanned again in a subsequent scanning process. Furthermore, the procedure can be modified in the following ways:

The examples given in FIG. 2 to FIG. 4 for illustration purposes can be applied in the same way to situations in which the building material is to be heated to a temperature below the melting temperature in a previous scanning procedure and only then, in a subsequent scanning procedure, the building material is at least partially solidified by heating above the melting temperature. In particular, it is also possible to combine a heating process by scanning before the actual melting process of the building material with a controlled cooling process by scanning after the melting process of the building material. Furthermore, the invention is not limited to the fact that locations of the building material are only scanned twice.

Finally, it is to be mentioned that a device 100 according to the invention for providing control data for an additive manufacturing device can be realized not only by software components alone, but also by hardware components alone or by mixtures of hardware and software. In particular, interfaces mentioned in the present application do not necessarily have to be hardware components, but can also be implemented as software modules, for example, if the input or output data can be taken over by other components already implemented on the same device, or have to be transferred to another component only by software. Likewise, the interfaces might consist of hardware and software components, such as a standard hardware interface that is specially configured by software for the specific purpose of use. In addition, multiple interfaces may also be combined in a common interface, for example an input-output interface.

The invention claimed is:

1. A computer-aided method for providing control data for an additive manufacturing device for manufacturing a three-dimensional object by the additive manufacturing device, wherein the object is manufactured by applying a building material, layer upon layer and by solidifying the building material by supplying radiation energy to locations in a layer corresponding to a cross section of the object in the layer by scanning the locations with at least one energy beam bundle according to a set of energy introduction parameters along a number of solidification paths by at least one energy introduction means for introducing energy into the building material, the method for providing control data comprising:
    a first step of accessing computer-based model data of a partial area of a cross-section of the object, a second step of generating a data model of the partial area, the data model specifying a solidification of the building material with at least one energy beam along at least one solidification path,
    wherein it is specified that a plurality of solidification path segments are scanned at least twice with an energy beam bundle,
    wherein an amount of energy to be introduced during a first scanning of a solidification path section is specified such that a temperature of the building material within an incidence area of the respective energy beam bundle is below a melting temperature during the first scanning of the solidification path, and the amount of energy introduced during a subsequent second scanning of the same solidification path section is specified such that the temperature of the building material within the incidence area of the respective energy beam bundle exceeds the melting temperature during the second scanning of the solidification path; or wherein the amount of energy to be introduced during the first scanning of a solidification path section is specified such that the temperature of the building material within the incidence area of the respective energy beam bundle exceeds the melting temperature during the first scanning of the solidification path, and the amount of energy introduced during a subsequent second scanning of the same solidification path section is specified such that the temperature of the building material within the incidence area of the respective energy beam bundle is below the melting temperature during the second scanning of the solidification path, and a third step in which control data corresponding to the data model generated in the second step are provided for generating a control data set for the additive manufacturing device.

2. The method according to claim 1, wherein in the second step it is specified that the energy beam bundle is used which is displaced across the building material by means of one and the same energy introduction device.

3. The method according to claim 1, wherein the solidification path sections scanned at least twice extend across an entire length of the solidification path.

4. The method according to claim 1, wherein in the second step it is specified that a process of scanning of solidification path sections is interrupted in order to scan solidification path sections already scanned again during the interruption with an energy beam bundle.

5. The method according to claim 1, wherein in the second step it is specified that a time distance between successive scanning operations of individual solidification path sections during a repeated scanning is different from the time distance between successive scanning operations of a same solidification path sections during a preceding scanning.

6. The method according to claim 5, wherein the time distance between successive scanning operations during repeated scanning is selected as a function of a length of the solidification path sections during a previous scanning.

7. The method according to claim 1, wherein in the second step it is specified that the at least one energy beam bundle is displaced along solidification path sections which are substantially parallel to each other.

8. The method according to claim 1, wherein in the second step it is specified that before the completion of the first scanning of all locations of the partial area with an energy beam bundle a renewed scanning of locations of the partial area with an energy beam bundle is carried out.

9. The method according to claim 1, wherein it is specified that, after the amount of energy introduced by an energy beam bundle at a location has led to the melting temperature of the building material within the incidence area of the energy beam bundle being exceeded, the energy introduced per unit area decreases monotonically at this the location during subsequent scanning processes.

10. The method according to claim 1, wherein it is specified that:
at a location the energy per unit area introduced by an energy beam bundle is too low to cause the melting temperature of the building material to be exceeded within the incidence area of the energy beam bundle, and the energy introduced per unit area increases monotonically with repeated scanning processes at this location until the melting temperature of the built-up material within the incidence area of the energy beam bundle is exceeded for the first time during a scanning process.

11. An additive manufacturing method for manufacturing a three-dimensional object by means of the additive manufacturing method, wherein the object is manufactured by applying a building material layer upon layer and by solidifying the building material by supplying radiation energy to locations in a layer corresponding to a cross-section of the object in the layer, by scanning the locations with at least one energy beam bundle according to a set of energy introduction parameters by at least one energy introduction means for introducing energy into the building material,
wherein a flow of the additive manufacturing process is controlled by a control data set generated using a method according to claim 1.

12. A computer program having program code means for executing all the steps of a method according to claim 1 when the computer program is executed on a data processor.

13. A method for providing control data for an additive manufacturing device for manufacturing a three-dimensional object by additive manufacturing of a building material, the method comprising:
accessing computer-based model data of a partial area of a cross-section of the three-dimensional object;
generating a data model of the partial area, the data model specifying a solidification path and a process for solidification, the solidification path defining where an energy beam solidifies the building material and the process including scanning a plurality of solidification path segments with an energy source in at least a first and second scanning,
wherein the energy source causes a temperature of the building material to be below a melting temperature of the building material during the first scanning and causes the temperature of the building material to be above the melting temperature of the building material in a second scanning; or the energy source causes the temperature of the building material to be above the melting temperature of the building material during the first scanning and causes the temperature of the building material to be below the melting temperature of the building material during the second scanning.

* * * * *